(12) United States Patent
Gourley et al.

(10) Patent No.: US 11,586,957 B2
(45) Date of Patent: Feb. 21, 2023

(54) PREDICTING AN EVENT TIMELINE FOR AN EVENT THAT HAS YET TO OCCUR

(71) Applicant: Primer Technologies, Inc., San Francisco, CA (US)

(72) Inventors: Sean William-Joseph Gourley, San Francisco, CA (US); John Bohannon, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 923 days.

(21) Appl. No.: 16/399,582

(22) Filed: Apr. 30, 2019

(65) Prior Publication Data
US 2019/0332959 A1 Oct. 31, 2019

Related U.S. Application Data

(60) Provisional application No. 62/664,745, filed on Apr. 30, 2018.

(51) Int. Cl.
| | |
|---|---|
| *G06N 5/04* | (2006.01) |
| *G06N 5/047* | (2023.01) |
| *G06N 5/022* | (2023.01) |
| *G06F 16/34* | (2019.01) |
| *G06F 16/9536* | (2019.01) |
| *G06Q 50/00* | (2012.01) |

(52) U.S. Cl.
CPC ........... *G06N 5/047* (2013.01); *G06F 16/345* (2019.01); *G06N 5/022* (2013.01); *G06F 16/9536* (2019.01); *G06Q 50/01* (2013.01)

(58) Field of Classification Search
CPC ... G06F 16/345; G06F 16/9536; G06N 5/047; G06N 5/022; G06Q 50/01
See application file for complete search history.

(56) References Cited

U.S. PATENT DOCUMENTS

| | | | |
|---|---|---|---|
| 9,805,373 B1 * | 10/2017 | Epelman-Wang | ........................... G06Q 30/0269 |
| 2008/0040321 A1 * | 2/2008 | Baeza-Yates | ....... G06F 16/2477 |
| 2015/0078726 A1 * | 3/2015 | Shakib | ................ G06F 16/5866 386/225 |
| 2017/0300935 A1 * | 10/2017 | Herbst | ............... G06Q 30/0201 |
| 2019/0116505 A1 * | 4/2019 | Bhorkar | ................ H04W 24/02 |

* cited by examiner

*Primary Examiner* — Etienne P Leroux

(57) ABSTRACT

The technology disclosed herein provides a summary of a predicted timeline for an event that has yet to occur. In a particular implementation, a method provides identifying a first event that has yet to occur. The method further provides identifying first data objects from a plurality of data objects obtained from a plurality of information sources. The first data objects include information pertinent to the first event. The method also provides extracting first time information relevant to the first event from the first data objects, determining a confidence level for each portion of the first time information, and generating a summary of the first time information based on the confidence level for each portion of the first time information.

20 Claims, 8 Drawing Sheets

| HISTORICAL SOURCE INFORMATION 511 | |
|---|---|
| SOURCE 501 | 95% ACCURATE |
| SOURCE 502 | 34% ACCURATE |
| SOURCE 503 | 73% ACCURATE |
| SOURCE 504 | 87% ACCURATE |

500

PREDICTING AN EVENT TIMELINE FOR AN EVENT THAT HAS YET TO OCCUR

RELATED APPLICATIONS

This application is a continuation of U.S. patent application Ser. No. 62/664,745, entitled "PREDICTING AN EVENT TIMELINE FOR AN EVENT THAT HAS YET TO OCCUR," filed Apr. 30, 2018, which is hereby incorporated by reference in its entirety

TECHNICAL BACKGROUND

News sources often generate images, articles, graphs, and other similar objects that are used in providing information about a particular event. These events may include financial events, world news events, local news events, among other possible events. The objects generated may include various facts, relevant images, or other similar data that can be used in providing a reader or viewer with information about the particular event. In some cases, the event referenced in an object has not yet occurred, such as a potential product announcement/release or a potential political announcement. Information about events that have not yet occurred will sometimes include speculative information about the timing for when certain aspects of an event will take place. Different sources may indicate different speculative time information and determining which time information is most likely correct can be very difficult if not impossible for someone with access to that time information.

OVERVIEW

The technology disclosed herein provides a summary of a predicted timeline for an event that has yet to occur. In a particular implementation, a method provides identifying a first event that has yet to occur. The method further provides identifying first data objects from a plurality of data objects obtained from a plurality of information sources. The first data objects include information pertinent to the first event. The method also provides extracting first time information relevant to the first event from the first data objects, determining a confidence level for each portion of the first time information, and generating a summary of the first time information based on the confidence level for each portion of the first time information.

In some examples, identifying the first event includes receiving input from a user that identifies the first event.

In some examples, identifying the first event includes automatically identifying the first event for processing from a plurality of events in the plurality of data objects.

In some examples, determining the confidence level for each portion of the first time information includes, for each portion of the first time information, using historical information regarding accuracy of an information source of the plurality of information sources from which a portion of the first time information was obtained to determine a likelihood that the portion of the first time information is accurate.

In some examples, generating the summary of the first time information based on the confidence level for each portion of the first time information includes, for each portion of the first time information, including a portion of the first time information in the summary when the confidence level of the portion of the first time information satisfies an inclusion criterion.

In some examples, generating the summary of the first time information based on the confidence level for each portion of the first time information includes determining a range of time for the first event from portions of the first time information having confidence levels that satisfy an inclusion criterion.

In some examples, after the first event occurs, the method includes updating historical information for the plurality of information sources to reflect the accuracy of the first time information. The historical information is used to determine a confidence level for a second event that has yet to occur.

In some examples, the plurality of data objects comprises documents, social media posts, videos, and/or audio files and, in some examples, the information sources comprise webpages and/or feeds.

In another implementation, an apparatus is provided including one or more computer readable storage media and a processing system operatively coupled with the one or more computer readable storage media. Program instructions stored on the one or more computer readable storage media, when read and executed by the processing system, direct the processing system to identify a first event that has yet to occur and identify first data objects from a plurality of data objects obtained from a plurality of information sources. The first data objects include information pertinent to the first event. The program instructions further direct the processing system to extract first time information relevant to the first event from the first data objects, determine a confidence level for each portion of the first time information, and generate a summary of the first time information based on the confidence level for each portion of the first time information.

DETAILED DESCRIPTION

Many different information sources may provide different information regarding an event that has yet to occur. The information may include what the event will be about (e.g., what product will be announced), where the event will take place (e.g., in a particular city), when the event will occur (e.g., when the announcement will happen), and/or any other information concerning the event that may be interesting to a consumer of that information. Since the event has yet to take place, it is highly likely that much, if not all, of the information about the event is mere speculation. It is therefore hard for a consumer of the information to determine whether any of the information is likely to be correct even if that consumer has access to all such information.

The examples herein focus on the time related information concerning an event. A summary service compiles time information about the event and provides that information as a summary to a consumer of the information. The summary provides the time information to the consumer in a more manageable format. That is, as its name implies, the consumer is provided with a summarization of what the summary service gleaned from the time information. The summary may indicate a general consensus between all the time information, may indicate the time information that is most likely to be correct, may indicate a time information that is least likely to be correct, or may provide the consumer with some other type of information descriptive of the time information. The consumer can then form their own opinions about the event with respect to the time information without having to find and parse through the time information themselves.

Figure 1:
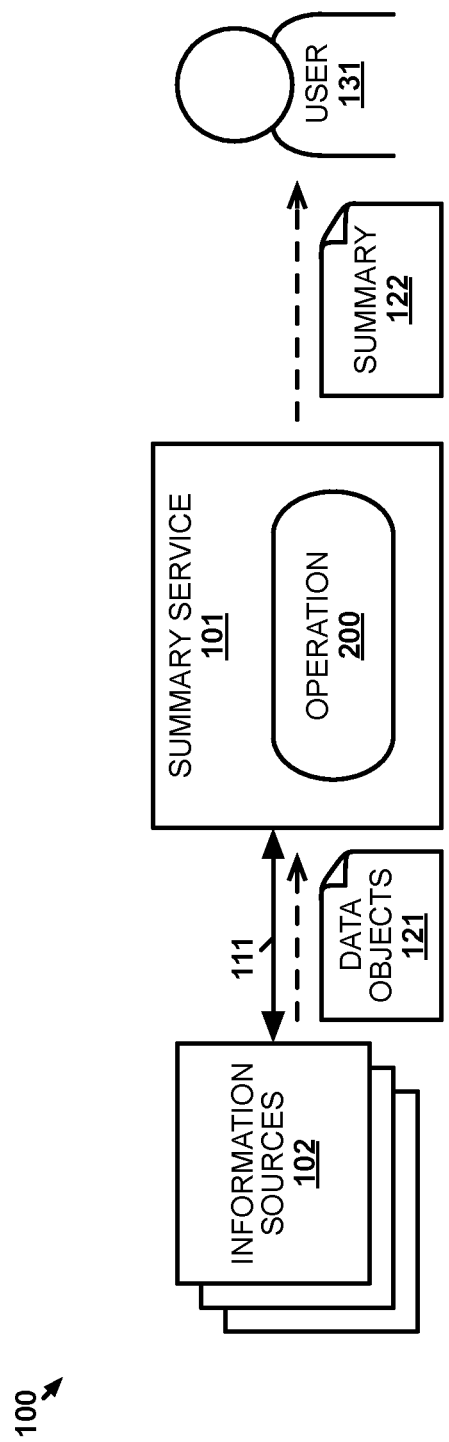
FIG. 1 illustrates a computing environment for predicting a timeline for an event that has yet to occur.

FIG. 1 illustrates computing environment 100 for predicting a timeline for an event that has yet to occur. Computing environment 100 includes summary service 101 and one or more information sources 102. Summary service 101 and information sources 102 communicate over communication link(s) 111. Communication link(s) 111 may be direct data links to information sources 102 or may include intervening systems, networks, and devices, such as the internet or local area networks.

Information sources 102 maintain and provide data objects 121, such as text news stories, video news stories, audio news stories, documents, social media posts, images, graphs, and other similar objects to provide information about various topics. For example, an information source in information sources 102 may be a news media website that provides a news article (i.e., data object) for a death of a diplomatic leader. Data objects 121 are obtained by summary service 101 to identify and summarize time information about events included therein that have yet to occur. In particular, summary service 101 performs operation 200 to generate summary 122 of the time information which is provided to user 131 so user 131 can consume that time information.

Figure 2:
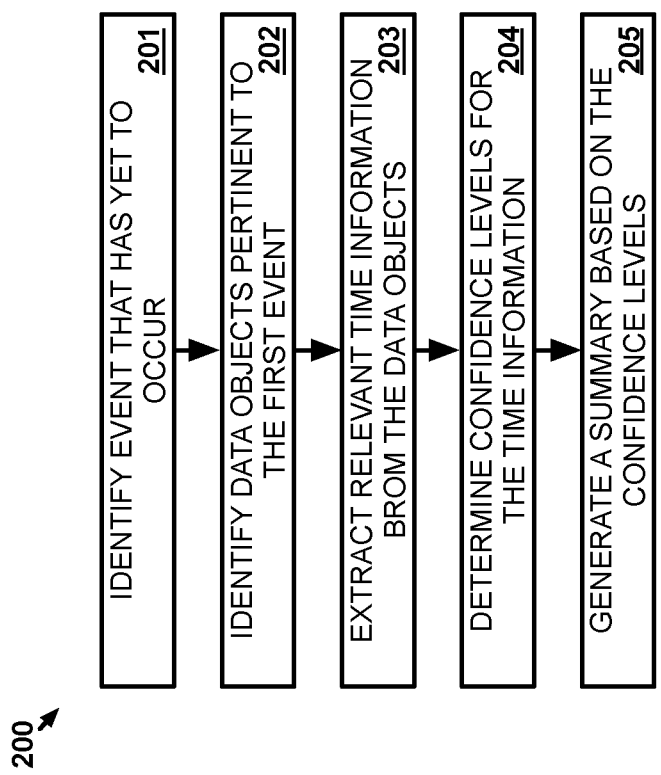
FIG. 2 illustrates an operation of the computing environment to predict a timeline for an event that has yet to occur.

FIG. 2 illustrates operation 200 of computing environment 100 to predict a timeline for an event that has yet to occur. For operation 200, summary service 101 identifies an event that has yet to occur (201). The event may be any event for which definitive time information is not yet available. In some cases, definitive time information may not be available simply due to the fact that the event has yet to occur or may not be available because definitive time information has yet to be released. For example, a manufacturer may have yet to provide a date for when a new product is going to be announced. User 131 may provide input to summary service 101 identifying the event to summary service 101. The input may be provided directly into a user interface of a computing system implementing summary service 101 or user 131 may use a user interface of another computing device in communication with summary service 101 (e.g., a workstation, laptop, tablet, phone, etc., of user 131). Alternatively, summary service 101 may automatically identify the event. For example, summary service 101 may be configured to monitor information sources 102 for events about which user 131 may be interested in consuming predicted time information.

Summary service 101 identifies data objects from data objects 121 obtained from information sources 102 (202). The identified data objects include information pertinent to the event identified above. In some examples, summary service 101 may be able to identify the pertinent data objects from data objects 121 without having to transfer data objects 121 from information sources 102 to summary service 101 (e.g., summary service 101 may use Application Programming Interfaces (APIs) of the respective information sources 102 to search data objects 121 directly on information sources 102). Alternatively, all or a portion of data objects 121 may be transferred to summary service 101 for processing. Summary service 101 may process data objects 121 for additional purposes other than those described herein.

After identifying the data objects, summary service 101 extracts time information relevant to the event from the identified data objects (203). Time information includes any information that would even suggest when the event is going to occur and/or a time duration of the event. For example, an event may be a music festival and time information may indicate when the music festival is going to start and how long it is going to run. The time information may indicate specific time(s) (e.g., a specific date), may indicate a range of time(s) (e.g., sometime in the month of August or between two dates), may indicate timing relative to other event (e.g., the event will occur sometime before or after another event), may indicate timing relative to when the time information was authored (e.g., within a month or two), or some other manner of indicating event timing.

Summary service 101 further determines a confidence level for each portion of the first time information (204). The confidence level effectively indicates how much weight any given portion of the time information should be given when generating summary 122. The confidence level may be represented as a scalar value, such as a percentage, that indicates confidence and can be compared to other values on the same scale. The confidence level may be determined from one or more factors that indicate whether a portion of time information is likely to be accurate. For instance, a confidence level for a portion of time information may be determined from the language used to present the portion of time information. Some words may indicate that the author of the portion of time information is uncertain themselves about whether the portion of time information is accurate while other words may indicate how certain the author of the portion of time information is about the portion of time information's accuracy. The confidence level may be determined based on context surrounding the time information in the data object from which the portion of the time information was extracted. In some examples, historical information related to the data object from which a portion of the time information was obtained may be used as an indicator of how confident summary service 301 should be regarding the accuracy of the portion of the time information.

Summary service 101 generates summary 122 of the time information based on the confidence level determined for each portion of the time information (205). Summary 122 may take the form of an image graphic, such as a graphical timeline, may be text describing the time information in prose, may be a bullet point list summarizing most relevant aspects of the time information, or may be produced in some other format that provides a concise overview to user 131 of what the time information indicates. Portions of time information with confidence levels that fail to satisfy a criterion for inclusion in summary 122, such as those portions with confidence levels that fall below a threshold confidence level, may not be used when generating summary 122. Likewise, portions of time information with confidence levels that satisfy a criterion for highlighting in summary 122, such as those portions with confidence levels that exceed another threshold confidence level, may be mentioned specifically in summary 122 or are otherwise more heavily weighted in summary 122. In some examples, the portions of time information may not agree (e.g., fail to agree on a particular date) and summary service 101 may determine a range of time from multiple portions of the time information, such as those portions with similar confidence levels. Other manners of summarizing the portions of the time information into summary 122 may instead be used and may be dependent upon what aspects of the time information are important to user 131. The aspects important to user 131 may be learned from input by user 131, may be gleaned by summary service 101 from monitoring the behavior of user 131, or by some other means.

Summary 122 may be provided to user 131 through a user interface of summary service 101 or through a user interface of another device operated by user 131 after being received from summary service 101, such as over a data network. Summary 122 may be displayed by a user interface or, in some cases, may be presented to the user audibly via a user interface if in a text based format.

Figure 3:
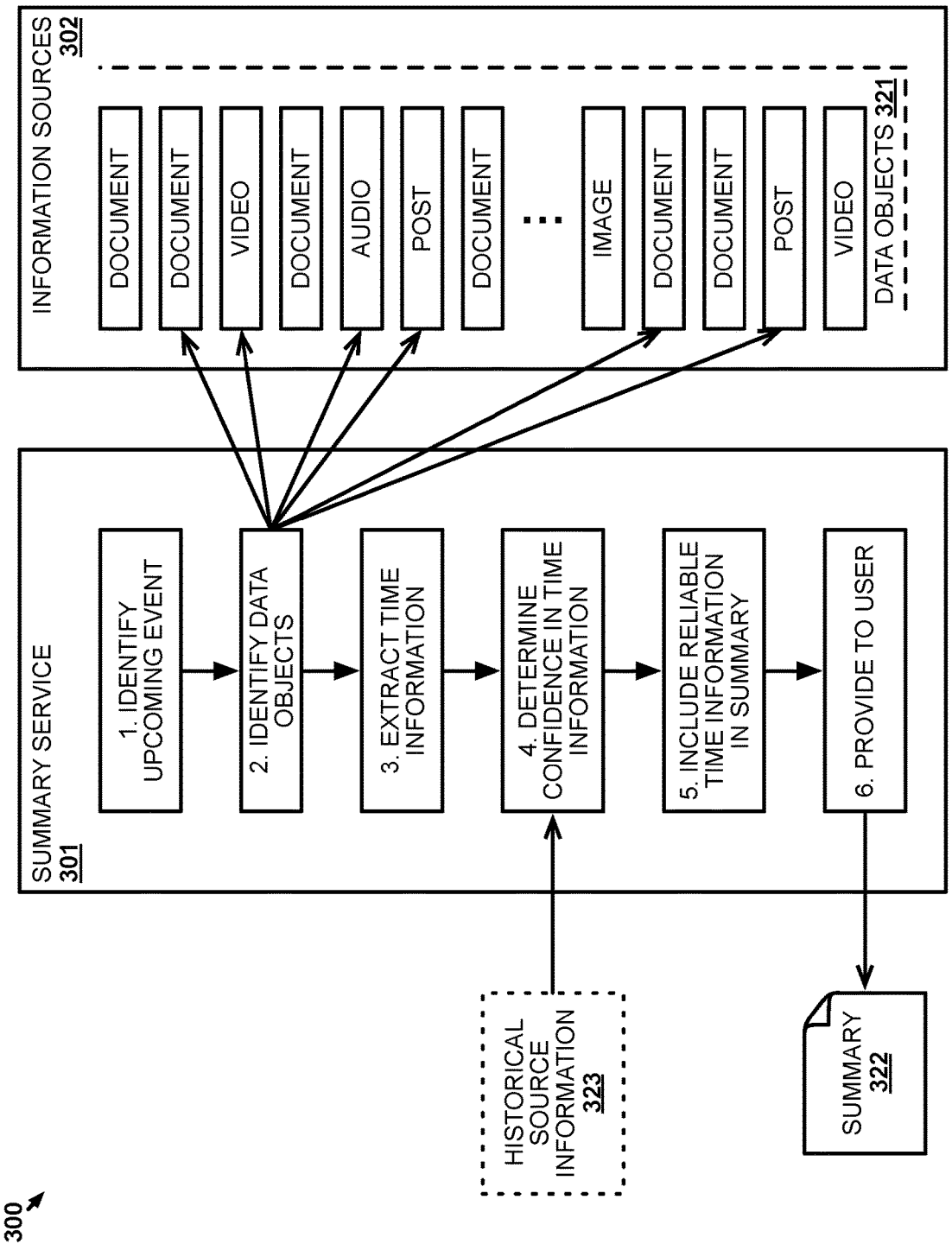
FIG. 3 illustrates another computing environment for predicting a timeline for an event that has yet to occur.

FIG. 3 illustrates computing environment 300 for predicting a timeline for an event that has yet to occur. Computing environment 300 includes summary service 301 and one or more information sources 302. Information sources 302 may comprise databases and/or websites capable of maintaining and providing data objects 321, such as articles, images, videos, social media posts, and other similar objects to provide information about various topics. Text based data objects, such as articles, are considered documents within data objects 321 although they may include other types of media therein.

In operation, summary service 301 identifies at step 1 an upcoming event for which a summary of time information should be generated. A user may provide input indicating the event, summary service 301 may simply summarize time information, if available, for all events in data objects 321, or summary service 301 may automatically determine the event from events in data objects 321. For example, based on the interests of a user, summary service 301 may determine what type(s) of events are of interest to the user. When such an event appears in data objects 321, summary service 301 may be triggered to summarize time information for the event.

Summary service 301 identifies at step 2 data objects of data objects 321 that include information relevant to the identified event. In this example, summary service 301 has identified two documents, two social media posts, one video object, and one audio object from data objects 321, although more (possibly many more) or fewer data objects may be identified in other examples. To identify the data objects of data objects 321, summary service 301 identifies traits within each data object and the relationship of the traits with those of other data objects to determine whether the data object corresponds to the event. For example, summary service 301 may identify key words/phrases, dates, numbers, persons of interest, or some other similar data point within a data object, and determine whether the object applies to the identified event.

From the identified data objects, summary service 301 extracts time information at step 3 from those identified data objects. The time information may include any information that pertains to some time related aspect of the event, such as an exact time or date when the event may occur, a range of times or dates when the event may occur, an indication of when the event will occur relative to another event (e.g., before or after and possibly how long before or after), or any other type of information indicative of when the event may occur. In some cases, such as with video, image, or audio information, summary service 301 may need to perform image and/or audio processing (e.g., optical character recognition, voice to text conversion, etc.) to obtain time information from a data object. Each of the identified data objects may include one or more portions of the time information. For example, if the event has multiple relevant dates, such as an announcement and a release date, then a data object may have a portion of the time information indicating the announcement date and another portion of the time information indicating the release date.

Summary service 301 further determines at step 4 a confidence level for each portion of the time information. In this example, summary service 301 uses historical source information 323 when determining a confidence level in each portion of the time information. Historical source information 323 may indicate how accurate time information in data objects from particular sources has been with predicting timing for previous events, how accurate time information in data objects from particular authors has been with predicting timing for previous events (either in general or based on a specific type of event), how accurate time information from particular types of sources (e.g., social media, blogs, news websites, etc.) has been with predicting timing for previous events, and/or provide past accuracy information for some other manner of categorizing sources. In some examples, summary service 301 may solely rely on historical source information 323 when determining a confidence level for a particular portion of the time information. For instance, if time information from a particular one of information sources 302 has been accurate 92% of the time according to historical source information 323, summary service 301 may simply determine that a portion of time information extracted at step 3 from a data object of that particular source is also 92% likely to be accurate. In other examples, summary service 301 historical source information 323 may only be one factor weighing on e301's confidence level determination. Other factors may include contextual information surrounding the portion of the time information in the data object, wording used by the author when conveying the portion of the time information, or some other factor indicative of the portion of the time information's likelihood of being accurate.

Summary service 301 includes at step 5 any portion of the time information deemed to be reliable based on their confidence levels when generating summary 322. A portion of the time information is reliable if its confidence level is deemed high enough by summary service 301 to likely prove to be accurate when the even actually occurs (or the aspect of the event to which the portion pertains actually occurs, such as the announcement date of the event). Summary service 301 may use various threshold confidence levels to determine whether any particular portion of the time information is included summary 322 and how much weight should be given to that portion of the time information. For example, while the confidence level for a portion of time information may not be high enough for it to be included in the main point of summary 322 it may still be high enough for a side note in summary 322.

Once generated summary service 301 provides summary 322 at step 6 to a user either through summary service 301's own user interface or by sending it to another device of the user having a user interface. Summary 322 may be displayed or presented audibly depending on the user interface capabilities for presenting summary 322 or may be based on a preference of the user.

Figure 4:
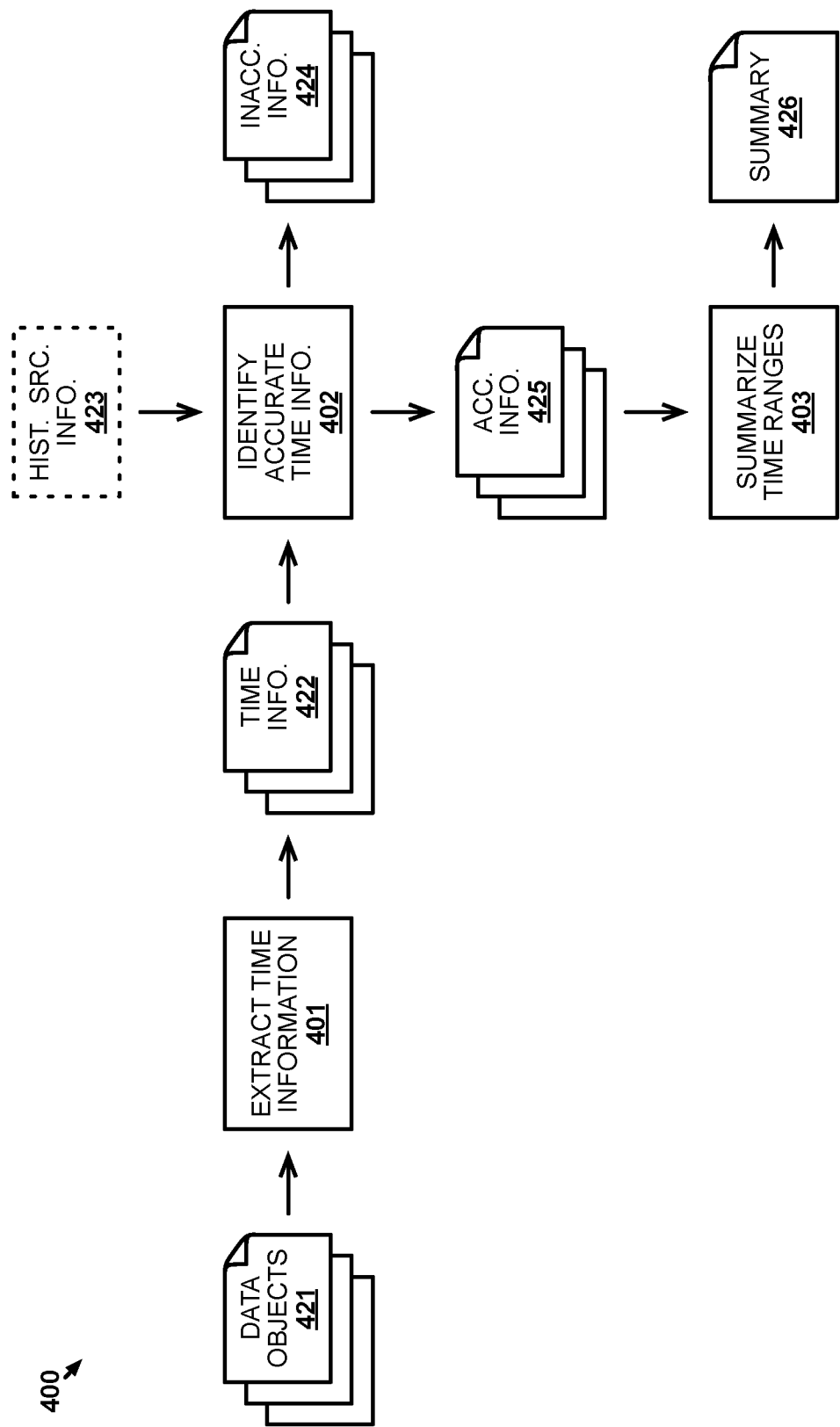
FIG. 4 illustrates a scenario for predicting a timeline for an event that has yet to occur.

FIG. 4 illustrates scenario 400 for predicting a timeline for an event that has yet to occur. In scenario 400, data objects 421 are an example of the data objects that may be identified from data objects 321 as pertaining to the identified event.

Time information 422 is extracted by summary service 301 from data objects 421 (401) before summary service 301 identifies inaccurate portions 424 of time information 422 and accurate portions 425 of time information 422 (402). Historical source information 423 is used to distinguish between inaccurate portions 424 of time information 422 and accurate portions 425 of time information 422. Inaccurate portions 424 of time information 422 are portions of time information 422 that are not likely to turn out accurate. Similarly, accurate portions 425 of time information 422 are portions of time information 422 that are more likely to turn out accurate. The actual accuracy of any of the portions cannot be determined until the actual event timing is known, which may not be until the event occurs. The likelihood that a portion of time information 422 is deemed accurate or inaccurate is determined based at least in part on historical source information 423 indicating whether the source of the portion is historically accurate with its event timing predictions. Only accurate portions 425 of time information 422 are considered when summary 426 is generated for presentation to a user (403).

Figure 5:
FIG. 5 illustrates a data structure for predicting a timeline for an event that has yet to occur.

FIG. 5 illustrates data structure 500 for predicting a timeline for an event that has yet to occur. Data structure 500 is represented as a table for the purposes of this example, although the information contained in data structure 500 may be formatted in some other manner. Data structure 500 includes historical source information 511. Historical source information 511 includes information describing the historical accuracy of respective information source 501, information source 502, information source 503, and information source 504. Historical source information 511 is an example of information that may be included in historical source information 423 or historical source information 323 from above. Likewise, information source 501, information source 502, information source 503, and information source 504 may be examples of information sources from information sources 102 and information sources 302.

In this example, historical source information 511 indicates the historical accuracy of time information in each of information source 501, information source 502, information source 503, and information source 504. Information source 501 has been 95% accurate historically, information source 502 has been 34% accurate historically, information source 503 has been 73% accurate historically, and information source 504 has been 87% accurate historically. Other examples may provide further granularity rather than providing accuracy of information sources as a whole. For instance, historical source information 511 may provide historical accuracy for individual authors of information from each information source. A summary service, such as summary service 301 or summary service 101, uses historical source information 511 to determine confidence levels for portions of time information extracted from each of information source 501, information source 502, information source 503, and information source 504. Absent other factors that may be used in addition to historical source information 511 to determine a confidence level, such as context or wording, a portion of time information extracted from information source 501 would be given a higher confidence level than a portion of information from information source 502, information source 503, and information source 504 due to information source 501 having a higher historical accuracy percentage than the others.

Thresholds may be used by a summary service to determine whether, and sometime how, a particular portion of time information is included in a summary of time information. For example, one threshold may indicate that a portion of time information should be included in the summary if the information source that the portion of time information is historically at least 75% accurate. In that case, portions of time information from information source 502 and information source 503 would be excluded from summary generation. Likewise, another threshold may indicate that portions of time information from sources that historically exceed 90% accuracy should be highlighted in the summary. In that case, the summary would provide a portion of time information extracted from information source 501 to a user and indicate to the user that time information from information source 501 is very likely to be accurate. Other types of threshold may also be used in other examples.

Figure 6:
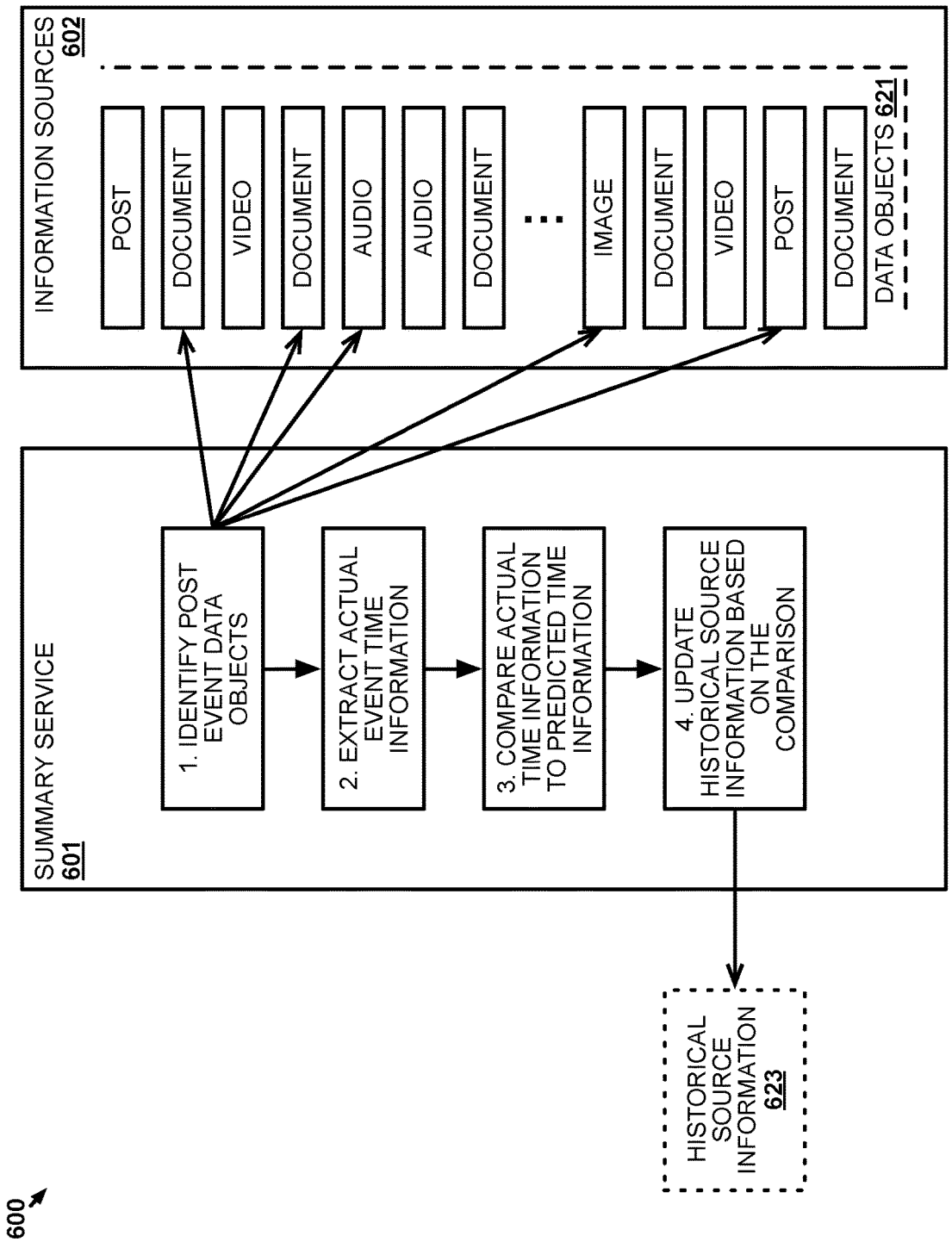
FIG. 6 illustrates another computing environment for predicting a timeline for an event that has yet to occur.

FIG. 6 illustrates computing environment 600 for predicting a timeline for an event that has yet to occur. Computing environment 600 includes summary service 601 and information sources 602. Similar to the examples above, information sources 602 may comprise databases and/or websites capable of maintaining and providing data objects 621, such as articles, images, videos, social media posts, and other similar objects to provide information about various topics. Text based data objects, such as articles, are considered documents within data objects 621 although they may include other types of media therein.

In operation, summary service 601 updates historical source information 623 once definitive time information is available for an event. The time information may be definitive when an authoritative source provides time information (e.g., an entity in charge of the event announces when the event will occur) or once the event has actually occurred. To update historical source information 623, summary service 601 identifies data objects at step 1 of data objects 621 that include information relevant to an event after definitive time information for the event is available. The event may be an event for which a summary of predicted time information was generated. While summary service 601 is shown to identify five data objects of data objects 621 that include information relevant to an event, summary service 601 may identify any number of data objects. In fact, when time information is definitive, only one data object may be needed to confirm that time information. However, it may be beneficial for summary service 601 to cross check between sources to ensure a source is properly reporting the time information. Thus, more than one data object would likely be preferred.

From the identified data objects, summary service 601 extracts the definitive time information at step 2 that indicates the actual timing of the event. The time information in a given data object may be presented in any number of manners including explicitly stating a day and/or time of the even occurrence, an event duration, explicitly stating a day and/or time relevant to another day and/or time (e.g., from the day a data object was published), or by some other means. Summary service 601 compares the extracted actual time information for the event to the time information that data objects for each respective information source of information sources 602 had predicted (e.g., the time information extracted from data objects 421, data objects 321, and data objects 121). From the comparison, summary service 601 is able to determine how accurate each information source was at predicting the actual time information for the event. The comparison could simply result in a binary determination of whether the predicted time information was correct or incorrect. Alternatively, more granular determinations may be made based on, for example, precision of the predicted time information. For instance, if a portion of predicted time information indicated a range of dates in which the event may occur, then the event occurring within that range, while technically accurate, is not very precise. Summary service 601 may therefore determine a level of correctness based on how precise the predicted time information was to the actual time information.

Summary service 601 uses the comparisons made above to update historical source information 623 at step 4. Essentially, if a particular information source was accurate then the historical accuracy of that information source as indicated by historical source information 623 will be increased accordingly (or at least stay the same if previous indications showed a similar or identical accuracy for the information source). If a particular information source was inaccurate, then the historical accuracy of that information source as indicated by historical source information 623 will be decreased accordingly. In some cases, historical source information 623 may indicate accuracy of information sources 602 as a whole while in other cases more granular accuracy indications may be included, such as indications per author, per topic, etc. Regardless, summary service 601's ability to update historical source information 623 ensures future summaries generated from predicted time information extracted are not based on outdated versions of historical source information 623.

Figure 7:
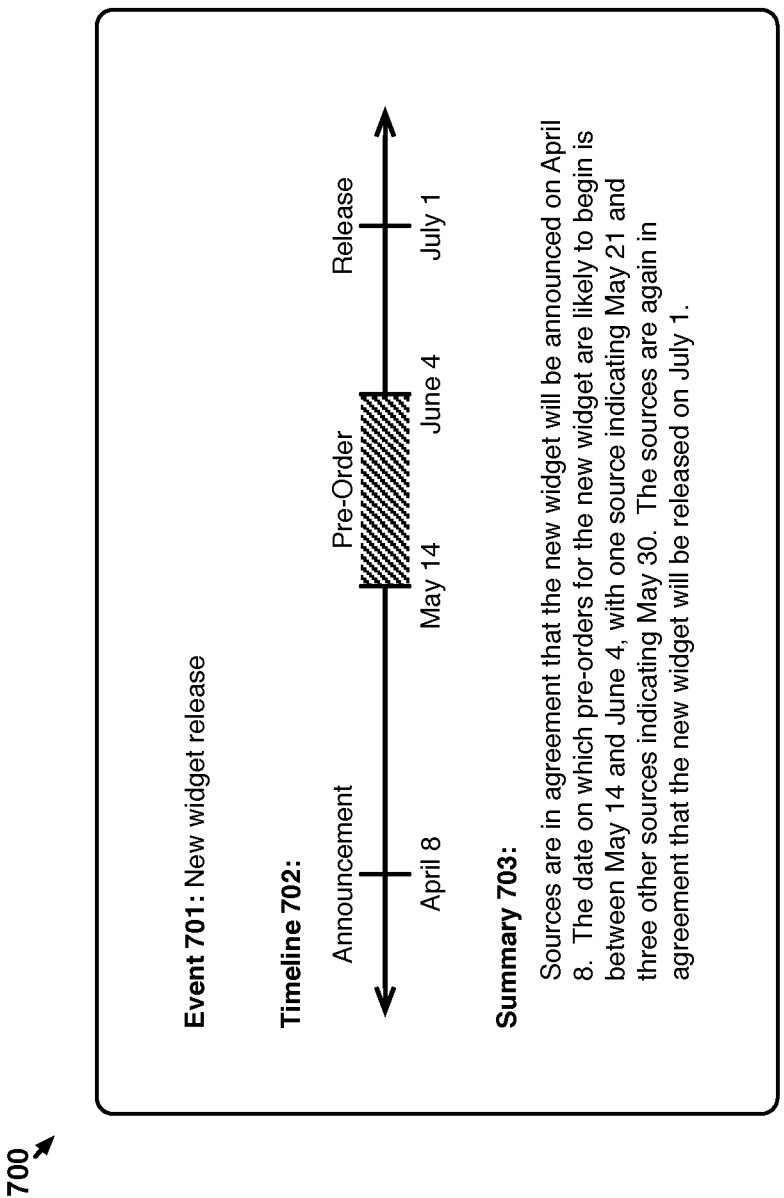
FIG. 7 illustrates an information display with a predicted timeline for an event that has yet to occur.

FIG. 7 illustrates information display 700 with a predicted a timeline for an event that has yet to occur. Information display 700 is an example of what may be presented to a user in the above examples and may be displayed by a user interface of a summary service or a user operated computing system. For example, information display 700 may be a display of summary 122, summary 322, or summary 426. Information display 700 displays event 701, graphical timeline 702, and summary 703. Other examples may provide more or less information and may be formatted differently.

In this example, event 701 of information display 700 is a new widget release. A user may have indicated event 701 to the summary service that generated information display 700 or the summary service may have automatically determined that event 701 should be summarized for a user. From extracted time information that speculated when certain aspects of event 701, the summary service summarized the timeline of event 701 with a graphical timeline 702. In other examples, each aspect of event 701 may be considered a separate event (i.e., new widget release announcement, new widget pre-order, and the actual release date of the new widget would all be separate events). Graphical timeline 702 allows a user to easily visualize at a glance when aspects of event 701 are predicted to occur. Summary 703 then provides the information from graphical timeline 702 in prose form with extra context that might not be apparent from graphical timeline 702. For example, while graphical timeline 702 simply provides a range in which sources of time information expect pre-orders for the new widget to begin, summary 703 further indicates a breakdown of portions of time information that contributed to the range. In some examples, information display 700 may further include user selectable elements (e.g., a button graphic) that allows a user to indicate what type of summary the user would like to view. For instance, the user may be able to select between graphical timeline 702 and summary 703 rather than information display 700 displaying both concurrently. Other user interface options may also be available in further examples.

Figure 8:
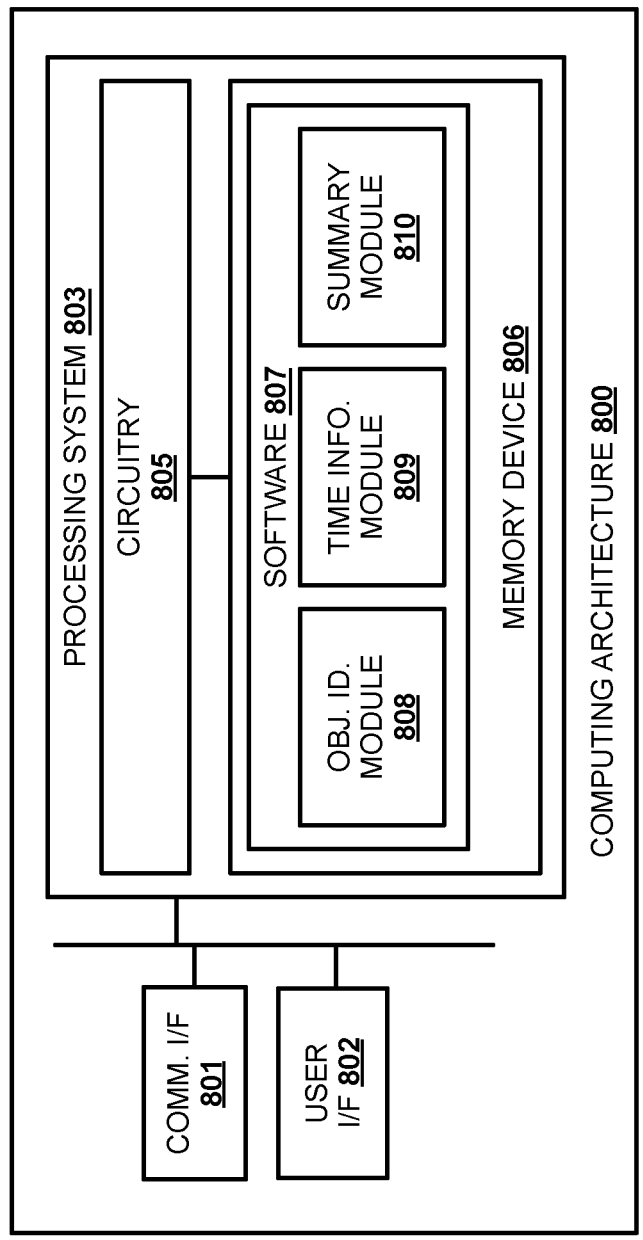
FIG. 8 illustrates a computing architecture for predicting a timeline for an event that has yet to occur.

FIG. 8 illustrates computing architecture 800 for predicting a timeline for an event that has yet to occur. Computing architecture 800 is representative of any computing system or systems with which the various operational architectures, processes, scenarios, and sequences disclosed herein for an event summary service may be implemented. Computing architecture 800 is an example of summary service 101, 301, and 601, although other examples may exist. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807. Computing architecture 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, communication interface 801 may be configured to communicate with information and supplemental resources to obtain objects for defining events. Communication interface 801 may further be configured to communicate with client or console devices of end users, wherein the users may request and receive summaries from computing system User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples. In some implementations, user interface 802 may be used in obtaining user summary requests and providing the summary to the requesting user.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes data object identification module 808, time information module 809, and summary module 810, although any number of software modules may provide the same operation. Operating software 807 may further include an operating system, utilities, drivers, network interfaces, applications, or some other type of software. When executed by processing circuitry 805, operating software 807 directs processing system 803 to operate computing architecture 800 as described herein.

In one implementation, data object identification module 808 directs processing system 803 to identify a first event that has yet to occur and identify first data objects from a plurality of data objects obtained from a plurality of information sources. The first data objects include information pertinent to the first event. Time information module 809 directs processing system 803 to extract first time information relevant to the first event from the first data objects and determine a confidence level for each portion of the first time information. Summary module 810 directs processing system 803 to generate a summary of the first time information based on the confidence level for each portion of the first time information.

Returning to the elements of FIG. 1, information sources 102 may comprise websites and/or databases capable of providing news stories, social media posts, blog posts, images, and other similar types of objects to summary service 101. Information sources 102 may comprise one or more communication interfaces, network interfaces, processing systems, computer systems, microprocessors, storage systems, storage media, or some other processing devices or software systems. Information sources 102 may comprise one or more serving computing systems, desktop computing systems, or some other similar computing system.

Summary service 101 comprise communication interfaces and network interfaces, processing systems, computer systems, microprocessors, storage systems, storage media, or some other processing devices or software systems, and can be distributed among multiple devices. Summary service 101 may include software such as an operating system, logs, databases, utilities, drivers, networking software, and other software stored on a computer-readable medium.

Communication between the summary service 101 and information sources 102 may use metal, glass, optical, air, space, or some other material as the transport media. Communication link 111 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 111 may be a direct link or may include intermediate networks, systems, or devices, and may include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for predicting an event timeline, the method comprising:
    identifying a first event that has yet to occur;
    before definitive time information is available for a first event that has yet to occur:
        in a computing system implementing a summary service, identifying first data objects from a plurality of data objects obtained from a plurality of information sources over a communication link, wherein the first data objects include information pertinent to the first event;
        extracting first time information relevant to the first event from the first data objects;
        determining a confidence level for each portion of the first time information, wherein each respective portion of the first time information indicates an occurrence time when the first event will occur, and wherein the confidence level for the respective portion of the first time information indicates a likelihood that the respective portion of the first time information is accurate;
        generating a summary of the first time information based on the confidence level for each portion of the first time information; and
        providing the summary to a user of the summary service.

2. The method of claim 1, wherein identifying the first event comprises:
    receiving input from a user that identifies the first event.

3. The method of claim 1, wherein identifying the first event comprises:
    automatically identifying the first event for processing from a plurality of events in the plurality of data objects.

4. The method of claim 1, wherein determining the confidence level for each portion of the first time information comprises:
    for each portion of the first time information, using historical source information regarding accuracy of an information source of the plurality of information sources from which the respective portion of the first time information was obtained to determine the likelihood that the respective portion of the first time information is accurate.

5. The method of claim 1, wherein generating the summary of the first time information based on the confidence level for each portion of the first time information comprises:
    for each portion of the first time information, including the respective portion of the first time information in the summary when the confidence level of the respective portion of the first time information satisfies an inclusion criterion.

6. The method of claim 1, wherein generating the summary of the first time information based on the confidence level for each portion of the first time information comprises:
    determining a range of time for the first event from portions of the first time information having confidence levels that satisfy an inclusion criterion.

7. The method of claim 1, further comprising:
    after the first event occurs, updating historical information for the plurality of information sources to reflect accuracy of the first time information, wherein the historical information is used to determine a confidence level for a second event that has yet to occur.

8. The method of claim 1, wherein the plurality of data objects comprises documents, social media posts, videos, and/or audio files.

9. The method of claim 1, wherein the information sources comprise webpages and/or feeds.

10. An apparatus for predicting an event timeline, the apparatus comprising:
one or more computer readable storage media;
a processing system operatively coupled with the one or more computer readable storage media; and
program instructions stored on the one or more computer readable storage media that, when read and executed by the processing system, direct the processing system to:
identify a first event that has yet to occur;
before definitive time information is available for a first event that has yet to occur:
identify first data objects from a plurality of data objects obtained from a plurality of information sources over a communication link, wherein the first data objects include information pertinent to the first event;
extract first time information relevant to the first event from the first data objects;
determine a confidence level for each portion of the first time information, wherein each respective portion of the first time information indicates an occurrence time when the first event will occur, and wherein the confidence level for the respective portion of the first time information indicates a likelihood that the respective portion of the first time information is accurate;
generate a summary of the first time information based on the confidence level for each portion of the first time information; and
provide the summary to a user of a summary service implemented by the apparatus.

11. The apparatus of claim 10, wherein to identify the first event, the program instructions direct the processing system to:
receive input from a user that identifies the first event.

12. The apparatus of claim 10, wherein to identify the first event, the program instructions direct the processing system to:
automatically identify the first event for processing from a plurality of events in the plurality of data objects.

13. The apparatus of claim 10, wherein to determine the confidence level for each portion of the first time information, the program instructions direct the processing system to:
for each portion of the first time information, use historical source information regarding accuracy of an information source of the plurality of information sources from which the respective portion of the first time information was obtained to determine the likelihood that the respective portion of the first time information is accurate.

14. The apparatus of claim 10, wherein to generate the summary of the first time information based on the confidence level for each portion of the first time information, the program instructions direct the processing system to:
for each portion of the first time information, include the respective portion of the first time information in the summary when the confidence level of the respective portion of the first time information satisfies an inclusion criterion.

15. The apparatus of claim 10, wherein to generate the summary of the first time information based on the confidence level for each portion of the first time information, the program instructions direct the processing system to:
determine a range of time for the first event from portions of the first time information having confidence levels that satisfy an inclusion criterion.

16. The apparatus of claim 10, wherein the program instructions further direct the processing system to:
after the first event occurs, update historical information for the plurality of information sources to reflect accuracy of the first time information, wherein the historical information is used to determine a confidence level for a second event that has yet to occur.

17. The apparatus of claim 10, wherein the plurality of data objects comprises documents, social media posts, videos, and/or audio files.

18. The apparatus of claim 10, wherein the information sources comprise webpages and/or feeds.

19. One or more computer readable storage media having program instructions stored thereon for predicting an event timeline, the program instructions, when read and executed by a processing system, direct the processing system to:
identify a first event that has yet to occur;
before definitive time information is available for a first event that has yet to occur:
identify first data objects from a plurality of data objects obtained from a plurality of information sources over a communication link, wherein the first data objects include information pertinent to the first event;
extract first time information relevant to the first event from the first data objects;
determine a confidence level for each portion of the first time information wherein each respective portion of the first time information indicates an occurrence time when the first event will occur, and wherein the confidence level for the respective portion of the first time information indicates a likelihood that the respective portion of the first time information is accurate;
generate a summary of the first time information based on the confidence level for each portion of the first time information; and
provide the summary to a user of a summary service implemented by the processing system.

20. The one or more computer readable storage media of claim 19, wherein to determine the confidence level for each portion of the first time information, the program instructions direct the processing system to:
for each portion of the first time information, use historical source information regarding accuracy of an information source of the plurality of information sources from which the respective portion of the first time information was obtained to determine the likelihood that the respective portion of the first time information is accurate.

* * * * *